Patented Aug. 6, 1935

2,010,756

UNITED STATES PATENT OFFICE 2,010,756

PROCESS FOR MANUFACTURING MULTIVALENT ELECTROLYTES AND PRODUCT

Albert L. Genter, Baltimore, Md.

No Drawing. Application January 18, 1935, Serial No. 2,452

18 Claims. (Cl. 23—87)

This invention relates to a new and improved method for manufacturing aqueous solutions of multivalent positive metal ions. By multivalent, I mean cations having a valency of three or more. More specifically, my invention relates to the manufacture of solutions of ferric chloride or equimolar solutions of ferric sulphate and ferric chloride from copperas or ferrous sulphate, aluminum chloride, and the like, and even from solutions containing various mixtures of such multivalent electrolytes.

This method therefore involves the oxidation of iron, aluminum and such to their highest positive valence state in the presence of water. By oxidation is meant, from the electro-chemical standpoint, the removal of electrons from an atom or ion, thereby resulting in a decrease in negative valence or, what amounts to the same thing, an increase in positive valence. Thus, an atom of iron, or aluminum, in losing three electrons (elementary units of negative electricity) goes into solution with three positive valence charges as $Fe^{+++}$ or $Al^{+++}$ and a bivalent ferrous ion, $Fe^{++}$, by losing one electron also increases in valence and becomes the ferric ion $Fe^{+++}$. Such increases in positive valence therefore constitute oxidation in the sense intended in my invention.

Solutions of ferric chloride are commercially made by starting with metallic iron and/or oxidation of ferrous chloride solutions.

Equimolar solutions of ferric sulphate and ferric chloride are generally produced by the oxidation of ferrous sulphate solutions.

Aluminum chloride is made by various heat treatments of aluminum minerals with other chlorides, carbon and chlorine gas.

All of these methods, and especially those involving the production of anhydrous chlorides of iron, aluminum, etc., by permitting chlorine gas to react with the respective metals at high temperatures, involve tedious operations and usually expensive equipment.

The manufacture of present commercial ferric chloride solutions takes place stepwise. Metallic scrap iron is first oxidized to the bivalent ferrous state by dissolving the iron in aqueous ferric chloride under the influence of external heat, whereby an equivalent amount of ferric chloride is reduced to the bivalent or ferrous state. This solution containing bivalent or ferrous chloride is then constantly recirculated in contacting towers with a countercurrent of chlorine gas. This recirculation of the aqueous ferrous chloride solution and chlorine is continued until all bivalent chloride present is oxidized to trivalent ferric chloride. A part of this solution is used for dissolving more iron and the balance is prepared for marketing.

The manufacture of equimolar solutions of ferric sulphate and ferric chloride (sometimes called chlorinated copperas) involves the oxidation of ferrous sulphate (copperas) to equivalent quantities of ferric sulphate and ferric chloride in the same solution by the action of liquid chlorine or chlorine gas on aqueous solutions of copperas. This process is likewise slow. Equipment similar to that used for producing ferric chloride can also be used.

Such reactions including the use of chlorine gas on the one hand and aqueous solutions of ferrous salts on the other hand are strictly contact or surface reactions, i. e., the reactions do not occur in the chlorine gas phase but in the liquid and depend therefore (a) on the amount of liquid surface exposed to the gas phase, (b) the concentration of ferrous ions in the solution, (c) the amount of chlorine that can be dissolved by the water and (d) the amount of chlorine contacting with the water surfaces. The speed of the oxidizing reactions is therefore entirely dependent upon the number of molecules and ions which take part in the reactions during a given time. This is the fundamental law of reaction velocity. Chlorine gas contacting with solution surfaces, presents but a very small proportion of the gaseous chlorine molecules in reactive form to such surfaces. Hence the reaction velocities are necessarily relatively slow.

I have discovered that by using a liquid solvent for the chlorine which by natural affinity dissolves a great deal more chlorine than does water, i. e., permits a greater chlorine concentration in an ionized condition than is the case with chlorine gas itself or with an aqueous solution of this gas, and then bringing this active solution in contact with the metals such as iron, manganese, aluminum, and the like in the presence of water, or bringing such active solution in contact with bivalent solutions of iron, manganese, etc., a greater oxidation velocity will result. This is one important feature of my invention.

As examples of such chlorine solvents, certain hydrocarbons, like those contained in gasolene, kerosene, and particularly such liquid chlorinated hydrocarbons as chloroform, carbon tetrachloride, pentachlorethane, chlorinated ethers, etc., which contain single bonds between the carbon atoms of the molecule are liquid at ordinary temperature, and are not chemically changed by contact with chlorine at ordinary temperatures, dissolve chlorine in copious amounts at ordinary temperatures. For example, at normal temperature and pressure one liter of carbon tetrachloride will dissolve and hold available twenty times as much chlorine as will an equal volume of pure water and will contain over 78 times as much chlorine as will one liter of pure chlorine gas. Solutions of chlorine in carbon tetrachloride and water, when in contact with one another and chlorine gas at normal temperature and pressure, will, according to the partition law, i. e., the law governing the distribution of soluble gas between the carbon tetrachloride and the water and the gas phase, show a chlorine concentration 20 times greater in the carbon tetrachloride than in the water and 78 times greater in the carbon tetrachloride than in the chlorine gas space. At higher temperatures the concentration of chlorine in the carbon tetrachloride will be considerably more than 20 times the amount of chlorine found in the water, e. g., at 28.6° C. the concentration will be 30.5 times greater and at 57.5° C. the concentration will be 35.2 times greater. This is due to the fact that chlorine hydrolyzes in dissolving in water, i. e.

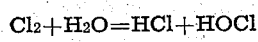
$$Cl_2 + H_2O = HCl + HOCl$$

thus resulting in a loss of available chlorine. The amount hydrolyzed increases with increasing temperature.

Chloroform, naptha and pentachlorethane will dissolve even more chlorine than does carbon tetrachloride; consequently mixtures of carbon tetrachloride with these various hydrocarbons will dissolve and render active copious amounts of chlorine. As a result of these facts, I have discovered that chlorine dissolved in such hydrocarbons or their mixtures is likewise more reactive toward wetted metals and solution ions of such metals as iron, manganese, aluminum, etc. This is undoubtedly due to the fundamental law governing the speed of reactions as already emphasized. It is likewise due to the nature of the chlorine solvents employed. My investigations have disclosed that such hydrocarbons exercise a far greater activating power on chlorine than when the chlorine is contacted with such metals and their ions, either in the gaseous or aqueous solution state at ordinary temperatures. I have also discovered that this is particularly true when such solutions of chlorine in hydrocarbons, or their mutual mixtures, are thoroughly mixed with aqueous solutions of ferrous salts. Extremely rapid and complete oxidation of the bivalent iron salts such as ferrous chloride, ferrous sulphate, ferrous nitrate, etc., to the trivalent or ferric state results. I have likewise found that such solutions of chlorine in these organic solvents rapidly mixed with water and circulated over pieces of iron, aluminum or manganese, rapidly dissolve these metals and oxidize them to the multivalent electrolytic state.

I have likewise found that the solutions of trivalent iron salts produced by the oxidation method of this invention do not contain any substantial amount of free hydrochloric acid as is found in the commercial ferric chloride solutions produced by the usual methods already described, i. e., the presence of free hydrochloric acid is negligible. In conventional methods, objectionable hydrolysis proceeds to a greater extent because of the slower reaction velocities and the use of water solutions of chlorine alone.

In view of the fact that such hydrocarbons are practically insoluble in water, after their use in rapidly oxidizing metals and metal ions to multivalent electrolytes, they can be promptly separated and removed from the final solutions of these electrolytes; then chlorine can again be dissolved in them, thus enabling one to repeatedly reuse the organic solvents for oxidation purposes as described and to practice a continuous process. The term "hydrocarbons" is intended to include the herein described hydrocarbons and chlorine compounds of organic solvents which are water insoluble and are capable of dissolving copious amounts of chlorine.

I am aware of the fact that carbon tetrachloride and such chlorinated hydrocarbons have been proposed as solvent means for chlorine so that it can be more conveniently stored and shipped or used as a vehicle for both chlorine and a dissolved catalytic agent as disclosed in Patent No. 1,454,873. However, this patent primarily provides for convenient storage and shipment of chlorine and secondarily for using such chlorine solutions in such hydrocarbons, containing dissolved catalytic agents, for chlorination purposes, i. e., substitution of hydrogen atoms in organic compounds by chlorine in the presence of catalytic agents that are soluble in the hydrocarbons, and under the influence of applied heat.

It must be borne in mind that my invention has nothing whatever to do with substitution of any hydrogen or such atoms in any organic compound and requires no application of external heat. In fact, the reactions involved proceed excellently at ordinary pressures and temperatures and even lower temperatures and furthermore result in the liberation of heat, for they are exothermic. Furthermore, as chlorine dissolved in such hydrocarbons is rendered more reactive for my purposes, and the hydrocarbons can be repeatedly reused, they themselves act as catalytic agents. My invention is concerned only with using chlorine dissolved in such hydrocarbons for changing the valence of such metals as iron and aluminum, etc., and bivalent ferrous ions, to trivalent ions in aqueous solution, i. e., for oxidation of metals and their electrolytes. It is therefore purposely limited to (a) dissolving liquid or gaseous chlorine in such water insoluble hydrocarbons, (b) circulating these chlorine solutions and water over metals such as iron and/or aluminum until trivalent ferric and aluminum chloride solutions of sufficient concentration result. Or, where ferrous chloride and/or sulphate are economically available, intimately mixing these hydrocarbon-chlorine solutions with one or a mixture of such salts in the presence of water and thereby oxidizing the ferrous iron of such electrolytes to the trivalent ferric state; (c) then permitting the hydrocarbons to settle away from the trivalent solutions, separating the two immiscible solutions, (d) and returning the hydrocarbons to the system whereby more chlorine is dissolved in them thus enabling them to be reused for the manufacture of fresh batches of multivalent electrolytes in the presence of water. If additional catalytic agents are to be used with my process in further accelerating the oxidation reactions, I prefer to use catalytes that are insoluble in both the hydrocarbons and water in order to prevent their loss.

I am also aware of the fact that carbon tetrachloride is likewise used for extracting hypochlorous acid in the manufacture of substantially pure and dry hypochlorite, without admixed calcium chloride, in Patents Nos. 1,481,639 and 1,481,040. However, this use has nothing whatever to do with the manufacture of multivalent electrolytes and the consequent valence changes involved in the present invention.

Process I

The production of aqueous solutions of trivalent ferric chloride, according to my invention, from (1) ferrous chloride salts or solutions thereof or (2) the production of equimolar solutions of ferric chloride and ferric sulphate from ferrous sulphate or the production of mixed solutions of ferric electrolytes from mixtures of ferrous chloride and ferrous sulphate is substantially as follows:—

(1) Chlorine from any convenient source, such as electrolytic cells or from commercially used liquid chlorine containers and tank cars, is rapidly stirred into a quantity of any of the hydrocarbons described or their mixtures. This dissolving of liquid or gaseous chlorine in such hydrocarbons is preferably accomplished in a covered container equipped with a stirrer and containing such hydrocarbons or mixtures thereof. Solution of the chlorine rapidly takes place and copious amounts of chlorine are taken up by such hydrocarbons, as already emphasized.

(2) This chlorine solution in hydrocarbons is then fed by gravity or pumped to a tank containing a water solution of ferrous chloride or ferrous sulphate, or solution mixtures of such bivalent salts. The amount of chlorine solution in such hydrocarbons will depend on the amount of ferrous salts to be treated, the concentration of such salts present in solution, and the speed of oxidation desired. The hydrocarbons mentioned are practically insoluble in the iron solution and the two solutions are then intimately and rapidly mixed by any convenient agitating means, such as stirrers or circulation pumps. This agitation breaks up the hydrocarbon-chlorine solution into fine drops and exposes considerable active surface to the admixed iron solution which is likewise dispersed. Reaction is carried out at normal or ordinary temperatures and pressures.

A rapid and active oxidation of ferrous ions in solution takes place as expressed in the following ionic equation:—

$$2Fe^{++} + Cl_2 \rightarrow 2Fe^{+++} + 2Cl^-$$

Thus the bivalent ferrous ions present increase in positive valence, become tri- i. e., multivalent and therefore become oxidized. A solution of ferric chloride results as expressed in the usual chemical reaction formula, $$2FeCl_2 + Cl_2 = 2FeCl_3$$

Where ferrous sulphate is used in water solution all bivalent iron is likewise oxidized to trivalent ferric ions and ferric sulphate and ferric chloride results according to the conventional chemical reaction formula, $$6FeSO_4 + 3Cl_2 = 2Fe_2(SO_4)_3 + 2FeCl_3$$

As chlorine dissolved in such hydrocarbons or chlorinated hydrocarbons appears to exist in the ionized or atomic state, the oxidation of bivalent iron takes place very rapidly, i. e., much more rapidly than when chlorine in gaseous or liquid form is introduced directly into such ferrous solutions.

(3) In contact with the aqueous ferrous solution, the hydrocarbons rapidly part with the dissolved chlorine which takes part in the oxidation reaction, and the mixture is then conducted to a third tank where the hydrocarbon, or hydrocarbon mixture with some chlorine remaining in solution, rapidly separates by gravity and surface tension from the dark brown ferric solution. The latter can be withdrawn from the separation tank and immediately used, stored, or further concentrated by evaporation and used. The separated hydrocarbon is then returned to the chlorine dissolving container already described and is then again saturated or partially saturated with chlorine and used again for oxidation purposes. Such hydrocarbons are therefore used over and over again as a catalytic solution activating means for chlorine and then for changing the valance of bivalent ferrous electrolytes to trivalent electrolytes as described. This process therefore permits operation as a continuous process, for, as the hydrocarbons issuing from the final settling or separation vessel are continuously reused, fresh bivalent salt solutions can be continuously conducted to the tank wherein oxidation takes place.

Carbon tetrachloride, alone and mixed with other hydrocarbons, is particularly adaptable to the foregoing described oxidation process. It is heavier than the solutions produced, non-inflammable, relatively inexpensive and, as before emphasized, dissolves and activates large amounts of chlorine. Its vapor tension can be decreased by mixing with such heavier chlorinated hydrocarbons as pentachlorethane, and it may likewise be mixed with solvent naphthas, thus rendering them non-inflammable without lessening their capacity for dissolving chlorine.

If it is desired, the first tank can be eliminated and the hydrocarbon and chlorine can be both introduced simultaneously and/or continuously to the tank containing the metal solution to be oxidized. Furthermore, successive tanks and contacting towers can be used. It will always be necessary to have a final tank in which the water solution of oxidized metallic salts can be separated from the immiscible hydrocarbons so that the latter can be reused as described while the oxidized metal solutions are removed from the manufacturing system.

In connection with the process described, the water can be independently added to the hydrocarbon-chlorine solution prior to or after the ferrous compound is added thereto. The ferrous compound thus may be added (1) in aqueous solution, or (2) in solid state.

Process II

As pointed out at the beginning, the customary method of making ferric chloride solutions from metallic iron contacting with water and chlorine gas, first necessitates the production of ferrous chloride by dissolving the iron in ferric chloride and then oxidizing this ferrous chloride solution with chlorine in contact towers. The metallic iron must therefore first be brought into the ionized ferrous state, thus $$Fe\ (solid) + 2Fe^{+++}\ (ferric\ ion) \rightarrow 3Fe^{++}\ (ferrous\ ion)$$

In practice this requires the application of external heat. Then the ferrous ions are oxidized in a second step to ferric ions as already shown. These successive reactions are separate, require external energy and the reaction speeds are relatively slow.

My process entirely eliminates the expensive necessity of first dissolving the metallic iron, for example, in ferric chloride in order to produce the ionized ferrous solution so that it can then be oxidized again to the ferric state.

I have discovered that chlorine dissolved in the aforementioned hydrocarbons and this solution together with water thoroughly contacted with metallic iron will rapidly and completely dissolve the iron and oxidize the resulting solution ions to the trivalent ferric state in the water present and at ordinary temperatures and pressures. This action takes place even in the presence of excess metallic iron.

The action is quite similar to that produced when iron is dissolved in aqua regia, which produces ferric chloride direct. Such solution and oxidation of metallic iron to the ferric state will not take place when iron is dissolved in hydrochloric acid for then only ferrous chloride results. The reaction proceeds so slowly in the presence of excess metal that any ferric chloride tending to form is reduced to ferrous chloride.

Consequently, my process of producing aqueous solutions of ferric chloride directly from metallic iron as now to be described is decidedly efficient and relatively inexpensive. The mixtures of water and the hydrocarbon-chlorine solutions when thoroughly agitated or contacted with metallic iron result in such active oxidation that considerable heat is liberated. The action is therefore strongly exothermic. Ferric chloride rapidly results and is concentrated in the water portion.

To effect the oxidation of metallic iron directly to trivalent chloride, (a) similar equipment and procedure to that already mentioned in the foregoing can be used. Or (b) pieces of iron can be tumbled in a closed earthenware drum with a mixture of water and the aforementioned hydrocarbons containing dissolved chlorine and the liquid mixture (1) periodically removed from the iron, after the solution has become sufficiently concentrated in iron, and (2) agitated in a separate tank to insure complete oxidation; then the hydrocarbons can be separated from the ferric solution by gravity and this can take place while the metallic iron is being treated with fresh hydrocarbon-chlorine solution and water. The hydrocarbon separated from the final ferric solution is then returned continuously or otherwise to the system as before described. This returned hydrocarbon can be saturated or partially saturated with liquid or gaseous chlorine or both prior to mixing with the metallic iron and water, or the chlorine solution and water mixture can be made directly in the presence of the iron.

I have also discovered that metallic aluminum as pure metal or scrap, or aluminum hydroxide can be similarly oxidized and dissolved as trivalent aluminum chloride. As before mentioned, the customary procedures of making aluminum chloride involve entirely different methods of treating compounds of aluminum at high temperatures. Using solutions of chlorine in the aforementioned hydrocarbons in the presence of water, I produce trivalent aluminum solutions in a simple and relatively inexpensive manner. The equipment and procedure used for this purpose is the same as those described for making trivalent ferric chloride from metallic iron.

I have likewise discovered that metallic iron and aluminum can be very rapidly dissolved and oxidized to the trivalent state in the presence of chlorine dissolved in such water insoluble hydrocarbons and/or their mutual mixtures, if the water used already contains dissolved ferrous and aluminum salts. Wherever it is permissible to have ferric ions associated with other anions, such as chloride, sulphate and others in common solution, as is the case with chlorinated copperas, such ferrous salts can be dissolved or partially dissolved in the water prior to and during the oxidation treatment of metallic iron. For example, if metallic iron is to be oxidized to the ferric state, the water used can contain as much ferrous sulphate or other iron salts as desirable. If permissible and desirable, this water may likewise contain aluminum salts. This procedure will result in a solution containing ferric ions associated with more chlorions than is the case with chlorinated copperas. Where solutions of ferrous chloride are available, they can also be used in dissolving metallic iron and oxidizing it to the ferric state by this method.

Aluminum and aluminum hydroxide may likewise be oxidized to trivalent ions in the presence of aluminum sulphate or iron salts, where such mixtures of solutions containing trivalent iron and aluminum salts are permissible and desirable. In fact, such treatment of aluminum and aluminum hydroxide in the presence of other aluminum or iron salts tends to hasten the dissolution and oxidation of the aluminum and aluminum hydroxide.

I have also discovered that the foregoing oxidation procedures can be further accelerated by the use of an insoluble catalyst, for example, manganese dioxide. Other insoluble catalysts may be used for this purpose. The black manganese dioxide is relatively insoluble in such hydrocarbons and in water. When it is suspended in a hydrocarbon-water mixture it remains suspended entirely in the liquid hydrocarbons, even when the mixture is violently agitated and allowed to settle. This is due to the fact that the hydrocarbons employed have a lower surface tension than the water or solutions of electrolytes accumulating in the water. These hydrocarbons therefore wet the surface of the manganese dioxide particles better and therefore displace the water from the dioxide surfaces. Consequently, in using such a catalytic agent as manganese dioxide, it will always remain suspended in the hydrocarbons containing chlorine in solution, and after these hydrocarbons have performed their function in oxidizing the aforementioned metals and their salts to multivalent electrolytes in aqueous solution, and are returned to the initial process, the suspended insoluble catalytic agent will automatically be returned with them.

Any solutions of tri- and tetravalent manganese chlorides that may incidentally be formed in small amounts when using this catalyte hold the chlorine loosely combined and may therefore aid in rendering chlorine more active for my purposes.

The process of manufacturing solutions of tri- and tetravalent metallic ions in accordance with my invention is of particular advantage and economic importance in the production of solutions containing multivalent positive ions used for coagulating negatively charged colloids and suspensions rich in such colloids. Trivalent aluminum and ferric chlorides and ferric sulphate are particularly effective for this purpose, and decidedly more effective than bivalent salts. I am therefore not concerned with the production of any bivalent compounds or the compounds of organic chemicals by this method.

In accordance with my invention, a very acceptable product particularly useful as a coagulant is obtained, the efficiency of which is greatly enhanced by reason of the absence of any substantial amount of hydrolyzed products. That is to say, I produce an aqueous electrolyte solution containing multivalent ions which is relatively devoid of hydrolyzed product. Thus, an aqueous electrolyte solution containing multivalent metal chlorides such as ferric chloride or aluminum chloride is produced which is relatively devoid of free hydrochloric acid. It will be appreciated therefore that the present invention enables the production of a solution characterized by having a maximum of multivalent metal ions, e. g., multivalent metal chlorides and a negligible minimum of hydrolyzed products such as free hydrochloric acid.

Although I have mentioned specific water insoluble hydrocarbons that have a large solution and activation capacity for chlorine and are heavier than water which is also essential to my process, thus enabling the hydrocarbon to be readily separated from the multivalent electrolyte solutions obtained, no unnecessary limitations should be placed on the particular hydrocarbons mentioned or water insoluble organic solvents. Hydrocarbons such as hexane and heptane and those found in ordinary naphtha and kerosene likewise have a large solution capacity for chlorine and are employed although they are lighter than the multivalent electrolyte solutions produced. That is, this does not hinder their use because being insoluble in water permits such lighter hydrocarbons to be readily separated from the final solutions of multivalent electrolytes produced. All hydrocarbons and their homologues and chlorinated compounds that are liquid at ordinary temperatures, water insoluble and have a capacity for dissolving and activating chlorine at substantially ordinary temperatures and pressures, and under the conditions essential to my process may also be used. For example, I have found that mixtures of carbon tetrachloride with pentachlorethane, chloroform, kerosene, the benzene series of hydrocarbons and such are very effective or mixtures of any of these several hydrocarbons are useful in my process. This permits one to dissolve hydrocarbons which are solid at ordinary temperature such as the higher chlorinated hydrocarbons, in chloroform, carbon tetrachloride or naphthas, thus producing mutual solutions that are liquid at ordinary temperatures and incidentally non-inflammable.

As stated initially, my invention broadly comprises the discovery that by using a liquid solvent for chlorine which by natural affinity dissolves a great deal more chlorine than water and bringing this active solution in contact with metals, in the presence of water, greater oxidation velocity will result. I am not therefore limited to the use of hydrocarbons for this purpose although they are preferred.

Various modifications can be made in the process and product all of which are comprehended within the scope of the appended claims.

I claim:—

1. The process of oxidizing metals capable of yielding cations having a valence of more than two to such multivalent electrolytes in the presence of water, liquid hydrocarbon solvent for chlorine and relatively insoluble in the water, and chlorine dissolved in said hydrocarbon, which comprises treating the metal with the chlorine solution in the presence of the water and producing such multivalent solute cations of the metal in the water solvent and separating the liquid hydrocarbon ingredient from the aqueous electrolyte solution.

2. The process of dissolving metallic iron and oxidizing its ions to trivalent ions in the presence of water, liquid hydrocarbon solvent for chlorine and relatively insoluble in the water, and chlorine dissolved in said hydrocarbon, which comprises treating the iron with the chlorine solution in the presence of the water thereby producing trivalent solute ions of iron in the water solvent, separating the liquid hydrocarbon ingredient from the aqueous electrolyte solution, and reusing the so separated hydrocarbon for chlorine solvent and iron oxidation purposes.

3. The process of oxidizing metallic aluminum to trivalent electrolyte in the presence of water, liquid hydrocarbon solvent for chlorine and relatively insoluble in the water, and chlorine dissolved in the hydrocarbon, which comprises treating the aluminum with the chlorine solution in the presence of the water thereby producing trivalent solute ions of aluminum in the water solvent, separating the hydrocarbon ingredient from the aqueous electrolyte solution, and re-using the hydrocarbon for chlorine solvent and aluminum oxidation purposes.

4. The process of augmenting the valence of iron in aqueous solution from bivalent to trivalent, which comprises dissolving chlorine in a liquid chlorine solvent hydrocarbon ingredient relatively insoluble in water, treating the aqueous solution containing the bivalent iron with said hydrocarbon-chlorine solution thereby changing the bivalent solute ions of iron to trivalent in the water solvent, separating the liquid hydrocarbon ingredient from the aqueous trivalent iron solution, and reusing the separated hydrocarbon for chlorine solvent and valence augmentation purposes.

5. The process of changing the valence of ferrous chloride to ferric chloride in aqueous solution, which comprises dissolving chlorine in a liquid chlorine solvent hydrocarbon ingredient relatively insoluble in water, treating the aqueous solution of ferrous chloride with said chlorine solution to thereby change the valence of the ferrous ions to ferric ions, separating the hydrocarbon ingredient from the aqueous solution of ferric chloride, and reusing the separated hydrocarbon ingredient for chlorine solvent and ferric chloride manufacturing purposes.

6. The process of oxidizing ferrous sulphate to ferric sulphate and ferric chloride in aqueous solution which comprises dissolving chlorine in a liquid chlorine solvent hydrocarbon ingredient relatively insoluble in water, treating the aqueous solution of ferrous sulphate with said chlorine solution to thereby change the valence of the ferrous ions to ferric ions in the presence of sulphate and chloride ions, separating the liquid hydrocarbon ingredient from the aqueous solution of ferric sulphate and chloride, and reusing the hydrocarbon ingredient for chlorine solvent and ferric sulphate and ferric chloride manufacturing purposes.

7. The method of dissolving metallic iron and oxidizing its solute ions to trivalent ions in the presence of an aqueous solution of ferrous salts, liquid hydrocarbon solvent for chlorine which is relatively insoluble in said solution, and chlorine dissolved in said hydrocarbon which comprises treating the iron and aqueous solution of ferrous salts with the chlorine solution to thereby produce a solution containing ferric ions, separating the liquid hydrocarbon ingredient from the aqueous solution of ferric salts, and reusing the hydrocarbon ingredient for chlorine solvent and ferric salt production.

8. The method of oxidizing aluminum to trivalent solute ions in the presence of an aqueous solution of iron salts, liquid hydrocarbon solvent for chlorine which is relatively insoluble in said aqueous solution, and chlorine dissolved in said hydrocarbon ingredient, which comprises treating the aluminum and aqueous solution with the chlorine solution to thereby produce a solution containing trivalent ions of iron and aluminum, separating the hydrocarbon ingredient from the trivalent electrolyte solution, and reusing the hydrocarbon for chlorine solvent and trivalent electrolyte manufacturing purposes.

9. The method of oxidizing aluminum compounds to trivalent solution ions in the presence of an aqueous solution of an electrolyte, liquid hydrocarbon solvent for chlorine which is relatively insoluble in said electrolyte solution, and chlorine dissolved in said hydrocarbon ingredient, which comprises treating the aluminum compound with the chlorine and aqueous solution to thereby produce a solution containing trivalent ions of aluminum, separating the hydrocarbon ingredient from the electrolyte solution, and reusing the hydrocarbon for chlorine solvent and trivalent electrolyte manufacturing purposes.

10. The method of producing trivalent cations of iron in the presence of water, a mixture of chlorine solvent hydrocarbons which is relatively insoluble in water, and chlorine dissolved in said hydrocarbon mixture, which comprises treating said metal and/or its ions with the chlorine solution to produce an electrolyte solution containing trivalent metal cations, separating the hydrocarbon mixture from the electrolyte solution, and reusing the hydrocarbon mixture for chlorine solvent and electrolyte manufacturing purposes.

11. The method of producing trivalent cations of iron in the presence of water, a liquid chlorinated hydrocarbon solvent for chlorine, and chlorine dissolved in said chlorinated hydrocarbon ingredient, which comprises treating said metal and/or its ions with the chlorine solution to produce an electrolyte solution containing trivalent metal cations, separating the hydrocarbon ingredient from the electrolyte solution, and reusing the hydrocarbon for chlorine solvent and electrolyte manufacturing purposes.

12. The method of producing trivalent cations of iron in the presence of water, carbon tetrachloride, and chlorine dissolved in said carbon tetrachloride, which comprises treating said metal and/or its ions with the chlorine solution to produce an electrolyte solution containing trivalent metal cations, separating the carbon tetrachloride from the electrolyte solution, and reusing the carbon tetrachloride for chlorine solvent and electrolyte manufacturing purposes.

13. The method of producing trivalent cations of iron in the presence of water, mixtures of any water insoluble hydrocarbon organic chlorine solvent with carbon tetrachloride, and chlorine dissolved in said mixture, which comprises treating said metal and/or its ions with the chlorine solution to produce an electrolyte solution containing trivalent metal cations, separating the hydrocarbon mixture from said electrolyte solution, and reusing the hydrocarbon mixture for chlorine solvent and electrolyte manufacturing purposes.

14. The method of converting metals capable of yielding cations of a valence of more than two into such multivalent cations in the presence of water, liquid chlorine solvent hydrocarbon insoluble in water, a relatively insoluble catalyte suspended in the hydrocarbon ingredient, and chlorine dissolved in the hydrocarbon ingredient, which comprises treating such metals and/or their cations with the water and chlorine solution containing the suspended catalyte to produce an aqueous solution containing metal cations having a valence of more than two, separating the hydrocarbons and catalyte suspended therein from the electrolyte solution, and reusing the hydrocarbon and catalyte for chlorine solvent and electrolyte manufacturing purposes.

15. The method of producing multivalent cations of metals having a valence of more than two in the presence of water, liquid chlorine solvent hydrocarbon insoluble in water, manganese dioxide suspended in said hydrocarbon ingredient, and chlorine dissolved in said hydrocarbon ingredients, which comprises treating such metals and/or their metal cations with the chlorine solution and manganese dioxide to produce an aqueous solution containing cations having a valence of more than two, separating the hydrocarbon and manganese dioxide from the aqueous electrolyte solution, and reusing the hydrocarbon and manganese dioxide for chlorine solvent and electrolyte manufacturing purposes.

16. The process of oxidizing metals capable of yielding solute cations of a valence of more than two to such multivalent cations in the presence of water, an organic chlorine solvent, liquid relatively insoluble in the water, and chlorine dissolved in said liquid, which comprises treating the metal with the chlorine solution in the presence of the water and producing multivalent solute cations of the metal in the water solvent.

17. The process of oxidizing metals capable of yielding solute cations of a valence of more than two to such multivalent cations in the presence of water, an organic chlorine solvent liquid relatively insoluble in the water, and chlorine dissolved in said liquid, which comprises treating the metal with the chlorine solution in the presence of the water and producing multivalent solute cations of the metal in the water solvent and separating the water insoluble liquid from the aqueous electrolyte solution.

18. The method of producing trivalent cations of iron in the presence of water, an organic chlorine solvent liquid relatively insoluble in water, and chlorine dissolved in said organic solvent, which comprises treating said iron and/or its ions with the chlorine solution to produce a solution containing trivalent cations of iron.

ALBERT L. GENTER.